(12) United States Patent
Austin et al.

US010257509B2

(10) Patent No.: US 10,257,509 B2
(45) Date of Patent: Apr. 9, 2019

(54) APPARATUS AND METHOD FOR MULTI CONFIGURATION NEAR EYE DISPLAY PERFORMANCE CHARACTERIZATION

(71) Applicant: GAMMA SCIENTIFIC INC., San Diego, CA (US)

(72) Inventors: Richard L. Austin, Del Mar, CA (US); Erik Stauber, Albany, CA (US); Brian C. Drews, San Diego, CA (US)

(73) Assignee: GAMMA SCIENTIFIC INC., San Diego, CA (US)

( * ) Notice: Subject to any disclaimer, the term of this patent is extended or adjusted under 35 U.S.C. 154(b) by 0 days.

(21) Appl. No.: 15/787,631

(22) Filed: Oct. 18, 2017

(65) Prior Publication Data

US 2018/0109783 A1  Apr. 19, 2018

Related U.S. Application Data

(60) Provisional application No. 62/409,804, filed on Oct. 18, 2016.

(51) Int. Cl.
*H04N 17/04* (2006.01)
*H04N 5/225* (2006.01)
(Continued)

(52) U.S. Cl.
CPC .............. *H04N 17/04* (2013.01); *G01J 1/00* (2013.01); *G01J 3/2823* (2013.01); *G01M 11/0257* (2013.01); *G01M 11/04* (2013.01); *G02B 1/11* (2013.01); *G02B 7/003* (2013.01); *G02B 27/142* (2013.01); *G02B 27/30* (2013.01); *G06F 3/011* (2013.01); *H04N 5/23293* (2013.01); *G02B 5/04* (2013.01);

*G02B 5/12* (2013.01); *G02B 7/04* (2013.01); *G02B 27/0172* (2013.01); *G02B 2027/014* (2013.01);
(Continued)

(58) Field of Classification Search
CPC ....................................................... H04N 17/04
See application file for complete search history.

(56) References Cited

U.S. PATENT DOCUMENTS

2007/0272844 A1\* 11/2007 Dominic ................... G01J 3/08
250/239
2016/0223819 A1\* 8/2016 Liu ..................... G02B 27/0172

OTHER PUBLICATIONS

Penczek, John, et al., Absolute Radiometric and Photometric Measurements of Near-Eye Displays, Journal of the Society for Information Display, vol. 25, Issue 4, Apr. 2017, 18 pages.

\* cited by examiner

*Primary Examiner* — Brian P Yenke
*Assistant Examiner* — Justin B Sanders
(74) *Attorney, Agent, or Firm* — Lewis Roca Rothgerber Christie LLP (57) ABSTRACT

System and method for performance characterization of multi configuration near eye displays includes: a mirror; a lamp; a beamsplitter; a collimating and reflective lens for collimating light reflected from the beamsplitter and reflecting it back towards an image sensor having a view finder; a field-of-view (FOV) aperture to project light from the lamp onto the DUT through the objective lens; a video viewfinder digital camera for capturing an virtual image of the DUT; a spectroradiometers for performing spectroradiometric measurements on a captured image of the defined measurement area to characterize the performance of the DUT; and a controller circuit for characterizing performance of the DUT based on the spectroradiometric measurements.

19 Claims, 5 Drawing Sheets

(51) Int. Cl.
  *G02B 7/00*     (2006.01)
  *G02B 1/11*     (2015.01)
  *G02B 27/30*    (2006.01)
  *H04N 5/232*    (2006.01)
  *G01J 3/28*     (2006.01)
  *G02B 27/14*    (2006.01)
  *G01J 1/00*     (2006.01)
  *G01M 11/02*    (2006.01)
  *G01M 11/04*    (2006.01)
  *G06F 3/01*     (2006.01)
  *H04N 5/272*    (2006.01)
  *G02B 7/04*     (2006.01)
  *G02B 5/04*     (2006.01)
  *G02B 5/12*     (2006.01)
  *G02B 27/01*    (2006.01)

(52) U.S. Cl.
  CPC .... *G02B 2027/0138* (2013.01); *H04N 5/2254* (2013.01); *H04N 5/272* (2013.01)

Aligning an optical axis of the optics apparatus with and optical axis of the DUT — 552

Defining a measurement area — 554

Performing adjustments — 556

Turning off the lamp. — 558

Capturing an image of the defined measurement area and a complete field of view of the viewfinder camera — 560

Moving the lamp and beamsplitter from the optical measurement axis — 562

Focusing the virtual image of the DUT onto a spatial mixer — 564

Collecting the virtual image onto a spectroradiometer — 566

Performing a spectroradiometric measurement

APPARATUS AND METHOD FOR MULTI CONFIGURATION NEAR EYE DISPLAY PERFORMANCE CHARACTERIZATION

CROSS-REFERENCE TO RELATED APPLICATIONS

This patent application claims priority to and the benefit of U.S. Provisional Patent Application Ser. No. 62/409,804, filed on Oct. 18, 2016 and entitled "System And Method For Multi Configuration Near Eye Display Performance Characterization," the entire content of which is hereby expressly incorporated herein by reference.

FIELD OF THE INVENTION

The present invention relates generally to optical system testing, and more particularly to performance characterization of multi configuration near eye displays.

BACKGROUND

Much attention has been paid recently to near eye displays (NED), specifically virtual reality (VR) and augmented reality (AR) viewers, particularly in the area of consumer electronics. A NED produces virtual image or scene, when positioned in front of and near the eye. In some NEDs, the virtual scenes are binocularly positioned in front of the left and right eyes so that the virtual scenes are perceived by human stereoscopic vision as three-dimensional scenes. In AR NEDs, the user of the NED can see through the optics that are part of the virtual scene delivery system producing the illumination in the design eye box and see the virtual scene content superimposed on the real world. VR NEDs produce virtual scenes that cannot be seen through.

A virtual scene is one that is presented to the eye of the observer with a lens or other optical conveyance so that it is collimated or nearly collimated. These types of devices are known as Near Eye Displays (NEDs) and Head Up Displays (HUDs). NEDs and HUDs are similar in that they both present virtual scenes to the eyes of display users. NEDs produce a virtual scene of both digital and analog content with pixel and raster scan display technologies.

In HUDs, the virtual scenes are presented to the display by reflecting off of an optical component or surface referred to as a beam combiner, positioned at a distance typically more than 30 cm from the eyes and not attached to the display head. The HUD beam combiner can be thought of a window that when the display user looks through it, the virtual scene of the presented information is superimposed on the real world seen through and on the opposite side of the beam combiner similar to the AR NEDs.

The virtual scene from NEDs and HUDs can be perceived by the eye if the entrance pupil of the eye is positioned within the area of the NED where the illumination from the virtual scene is projected by the optical design of the NED. This area is often referred to as the design eye box of the NED. The uniformity of the illumination in the plane of the eye entrance pupil can vary in intensity depending on the position within the plane bounded on the outside by the edges of the design eye box. In some embodiments, a small (for example, 2 to 5 mm) diameter aperture is selected to simulate the entrance aperture pupil of the eye.

As NEDs transition from novelties to mainstream products, achieving dependable and predictable performance will become increasingly critical. For consumer NED systems, this is necessary in order to ensure a consistent user experience, and to guarantee that products reliably meet both cosmetic and performance standards that are congruent with the manufacturer's brand identity. For commercial NEDs, particularly those for avionics and military uses, achieving a specified performance level is often critical to the correct functioning of the device in its application.

However, a lag in NED testing capabilities occurs because the optical systems employed in these devices, and the way they are utilized by the viewer, are both somewhat unique. As a result, traditional optical metrology equipment cannot be simply adapted to the demands of NED testing and thus a new approach is necessary.

All NEDs include three essential elements. The first is a display or source of some type, which generates light or a scene. The second is an optical system which projects the light into the viewer's eye(s). These optics are necessary because most people cannot comfortably focus on an object which appears to be close (e.g. less than two inches) to the eye. Thus, the optics create a virtual scene of the display source which appears to be at a sufficient distance for easy accommodation, and also allows for stereoscopic scene fusion if the device provides a 3D scene. Furthermore, the optics may combine the display output with a view of the actual scene surrounding the user (AR), or entirely block off any view of the true environment (VR). The final component of a NED is the mechanics to hold the first two elements on, or in front of, the viewer's head and position them properly with respect to the user's eyes.

There are already quite a number of different design forms for NEDs in use or in development. These vary substantially in terms of the technology used for scene generation and the configuration of their optics. Nevertheless, whatever the underlying design for a particular NED, the combined output of the display and optics can be characterized by a few key parameters.

Exit pupil is the area of the region of the volume or area of light formed by the NED optics. If the eye is placed anywhere within the exit pupil, it will see the entire field of view of the display scene or image. In some embodiments, the exit pupil is in the range of 15 to 20 mm wide, since this size provides for some tolerance in the placement of the eye relative to the optics, and also allows for the variations in inter-pupillary distance which naturally occur in the population.

Eye box, (e.g., ISO9241-302 &-305 defined as Qualified Viewing Space) is a volume that contains the NED exit pupil and extends back towards the eye as well as forward toward the NED device. If the eye is placed anywhere within the eye box, the viewer will see entire the field of view of the display. Eye relief refers to the distance from the exit pupil to the nearest surface of the NED optics. In some embodiments, eye relief is designed to be large enough (>20 mm) to allow space for the eyes of users who wear eyeglasses to access this point. Field of view (FOV) is the horizontal and vertical angle, which the display appears to subtend as seen by the viewer's eye.

The optical parameters most typically measured for NEDs and for most types of displays include output spatial uniformity, contrast ratio and absolute luminance and color accuracy. For larger displays, such as flat panel displays and projectors, uniformity is traditionally measured using an imaging colorimeter or some other type of calibrated, camera based apparatus. Absolute luminance and color is usually measured using a spectroradiometer with narrow field of view collecting optics (e.g. a telescope).

For optical radiance measurements in a radiometer or spectroradiometer, focusing optics (objective lens) and a measurement area defining aperture (field stop) assures that a specific area on a surface, for example, an area of pixels in a device under test such as a liquid crystal display, is isolated for measurement. The defined measurement area, seen in a view finder by a view finder image sensor is the same as that to which the radiometer image sensor is responding. For precise spectroradiometric measurements of the virtual scene in NEDs and HUDs, the objective lens entrance pupil diameter needs to be smaller than the projected illumination area that the display users eye is to be positioned for optimum performance of the display (design eye position) and in some cases smaller than the typical human eye iris. The center of the entrance pupil also needs to be located at the display design eye position. Selecting different areas of the virtual display scene field of view requires the angular pointing of the spectroradiometer with only pivot motion of the entrance pupil relative to the design eye position.

However, it is not practical in the radiometer art to provide some manner in which a user can see from the viewpoint of the radiometer image sensor, without utilizing a view finder. Means are needed for assuring that what the view finder sees is substantially identical to what the radiometer image sensor is responding to. If the images seen by the view finder and the radiometer image sensor do not correspond, the radiometer output may be inaccurate and meaningless. An apparatus for performing such a function is described in the U.S. Pat. No. 3,813,172, the entire contents of which is hereby expressly incorporated by reference. In that apparatus, an objective lens is focused on a surface and focused on to a beam splitting aperture wheel. A portion of the focused light is directed to an opto-mechanical view finder, and the light directed through the aperture is delivered to a radiometer photo sensor. This radiometer illustrates principles utilized in maintaining the view seen by the view finder in registration with the view seen by the photo sensor.

An individual pixel in a color display may be as small as 1 arcminute by 1 arcminute In order to take a measurement from the pixel, the portion of a virtual scene, i.e., the virtual scene plane on which the radiometer must focus, must be less than 1 arcminute by 1 arcminute. Further, it is unsuitable to use a view finder eyepiece that has inadequate resolution to resolve the details of a single pixel or sub-pixel for the purpose of determining the depth of contrast produce by the display. Also, some forms of emitters or reflector have some polarizing effect on the light therefrom. Certain optical arrangements can exacerbate any effects due to this phenomenon. Augmented Reality and Virtual Reality displays present additional challenges in the use of spectroradiometers for luminance and color measurement mainly resulting from the requirement that the optical collection system have an entrance pupil smaller than the design eye box which leads to low light levels available for the spectral radiance measurement.

Moreover, the collection optics preserve the spatial information of the source. This is necessary in order to make accurate color and luminance (the intensity of light emitted from a surface per unit area in a given direction) measurements of any given sub-region of the display. For example, it might be desirable to measure the characteristics color and luminance of a single displayed character or symbol. Therefore, integrating spheres, fiber optics, or any other collection optics that do not preserve angular information are not useful for this type of NED measurement.

Another difficulty with employing traditional spectroradiometer collection optics with most NEDs is that they are typically too large to fit within the available space. Specifically, many NEDs are built into eyeglasses, goggles, headsets or helmets, enabling them to be worn by the user. This means that the collection optics for any test gear must be able to fit into the same space as the user's head or eyes. Indeed, in many cases, the test system should even be small enough to allow it to independently access the output of the left and right eye positions of the NED display. Thus, the ideal optics for NED testing should have a form factor which is about half the size of the available space for the viewer's eyes.

SUMMARY

In some embodiments, the present invention is a method for performance characterization of multi configuration near eye displays as a device under test (DUT) by an optical apparatus, the optical apparatus including a viewfinder digital camera. The method include: aligning an optical axis of the optics apparatus with an optical axis of the DUT to establish an optical measurement axis, wherein the aligning comprises superimposing a first image of a field-of-view (FOV) aperture illuminated by a lamp and reflected from a beamsplitter that is collimated and reflected back onto the beamsplitter onto a second image of the FOV aperture projected onto the DUT and reflected back onto said beamsplitter; defining a measurement area on a virtual image of the DUT; performing adjustments to transpose the captured image of the defined measurement area and the complete field of view of the view finder to establish alignment of the FOV measurement aperture to another area within the DUT scene field of view; turning off the lamp; capturing an image of the defined measurement area and a complete field of view of the viewfinder digital camera, wherein the captured image of the defined measurement area and the captured image of complete field of view of the viewfinder digital camera are both reflected from said beamsplitter; moving the lamp and the beamsplitter from the optical measurement axis; projecting the virtual image of the DUT onto a field of view measurement aperture; focusing an image of an entrance pupil of the optical apparatus onto a spatial mixer; collecting the virtual image from the spatial mixer onto a spectroradiometer; and performing spectroradiometric measurements on the captured image of the defined measurement area.

In some embodiments, the present invention is an apparatus for performance characterization of multi configuration near eye displays as a DUT. The apparatus includes: a mirror with elevation angle adjustment and azimuth angle adjustment positioned perpendicular an optical axis of the apparatus; an objective lens to capturing light from and projecting light to the DUT; a lamp for projecting light and illuminating a first image of a field-of-view (FOV) aperture; a beamsplitter positioned between the objective lens and the lamp for reflecting light from the lamp; a collimating and reflective lens for collimating light reflected from the beamsplitter and reflecting it back towards an image sensor having a view finder to capture an virtual image of the DUT; a field-of-view (FOV) aperture to project light from the lamp onto the DUT through the objective lens; a spectroradiometers for performing spectroradiometric measurements on a captured image of the defined measurement area to characterize the performance of the DUT; and a controller circuit for characterizing performance of the DUT based on the spectroradiometric measurements, wherein the first image of the FOV aperture reflected from the beamsplitter, collimated and reflected back onto the beamsplitter by the collimating and reflective lens is superimposed onto a second image of the FOV aperture projected onto the DUT and reflected back onto said beamsplitter though the objective lens to align an optical axis of the optics apparatus with an optical axis of the DUT to establish an optical measurement axis.

The spectroradiometric measurements may then be correlated to a corresponding measurement area on the captured DUT virtual image for luminance and color uniformity determination. Also, the captured image DUT virtual may be analyzed for uniformity and resolution of the DUT virtual image through a depth of contrast measurement or Fourier Transform computation.

DETAILED DESCRIPTION

Although the disclosed invention has been described herein mostly as a spectroradiometer for brevity purposes, the invention is not limited to spectroradiometers and includes radiometers, photometers, imaging photometers/colorimeters, parallax and modulation transfer function analyzers used for the performance characterization of virtual scenes produced by HUDs and both AR and VR near eye displays.

In some embodiments, the disclosed invention combines different configurations of the optical components to provide a dimensionally compact size that allows an adjustable radiometric entrance pupil for example, less than 7 mm diameter, to be positioned in a design eye location and be rotated in azimuth and elevation angles about horizontal and vertical axes in the plane of the radiometric entrance pupil as well as, for example, 10 mm to 13 mm back from the entrance pupil plane assuring the radiometer measurement is reading the same area as would be seen by a human eye as it rotates through the qualified viewing space.

In some embodiments, the disclosed invention is a compact optical radiance collection optical/electro mechanical assembly that is configurable into different modes of operation and couples to a selection of optical power and energy sensors. The assembly precisely measures near eye and head up display image radiance, spectral radiance, luminance, color, luminance and color distribution in the virtual scene, angular size of the field of display scene, distribution of the light in the qualified viewing space, parallax within the a single view of a virtual scene, parallax between the left and right eye views of the virtual scene, modulation transfer function of the displayed virtual scene and through the combining and presentation optics of augmented reality displays, depth of contrast and flicker.

In some embodiments, the compact telescope of the disclosed invention may be roughly viewed as a video camera system that looks at a surface, or virtual scene plane to measure light emitted therefrom, whether by emission, reflection or transmission. The compact telescope includes an objective lens focused on the emitting surface or virtual scene to produce an image within the spectroradiometer. The compact telescope delivery optics deliver light from the virtual scene plane to a spectroradiometer image sensor of the video camera system. Delivery optics also delivers light from the scene plane to a measurement field of view (field stop) aperture. The delivery optics may include optics for focusing the viewed area on the image sensor of the video camera system. The delivery optics may be mounted on rotating axes that allows its direction to be changed so that the field stop aperture can be positioned to another point in the virtual field of view. The delivery optics may be mounted on translating axes that allows the position of the entrance pupil to be changed so that the field stop aperture can be positioned to another point in the virtual field of view and determine the extents of the design eye box (qualified viewing space) as a function of a measurand. The delivery optics may include further components such as a diffraction grating and/or a photomultiplier tube and/or photodiodes to provide additional intelligence to be sensed. The delivery optics may include further components such as a photodiode and current or voltage amplifier to provide additional intelligence on the flicker characteristics to be sensed.

Figure 1:
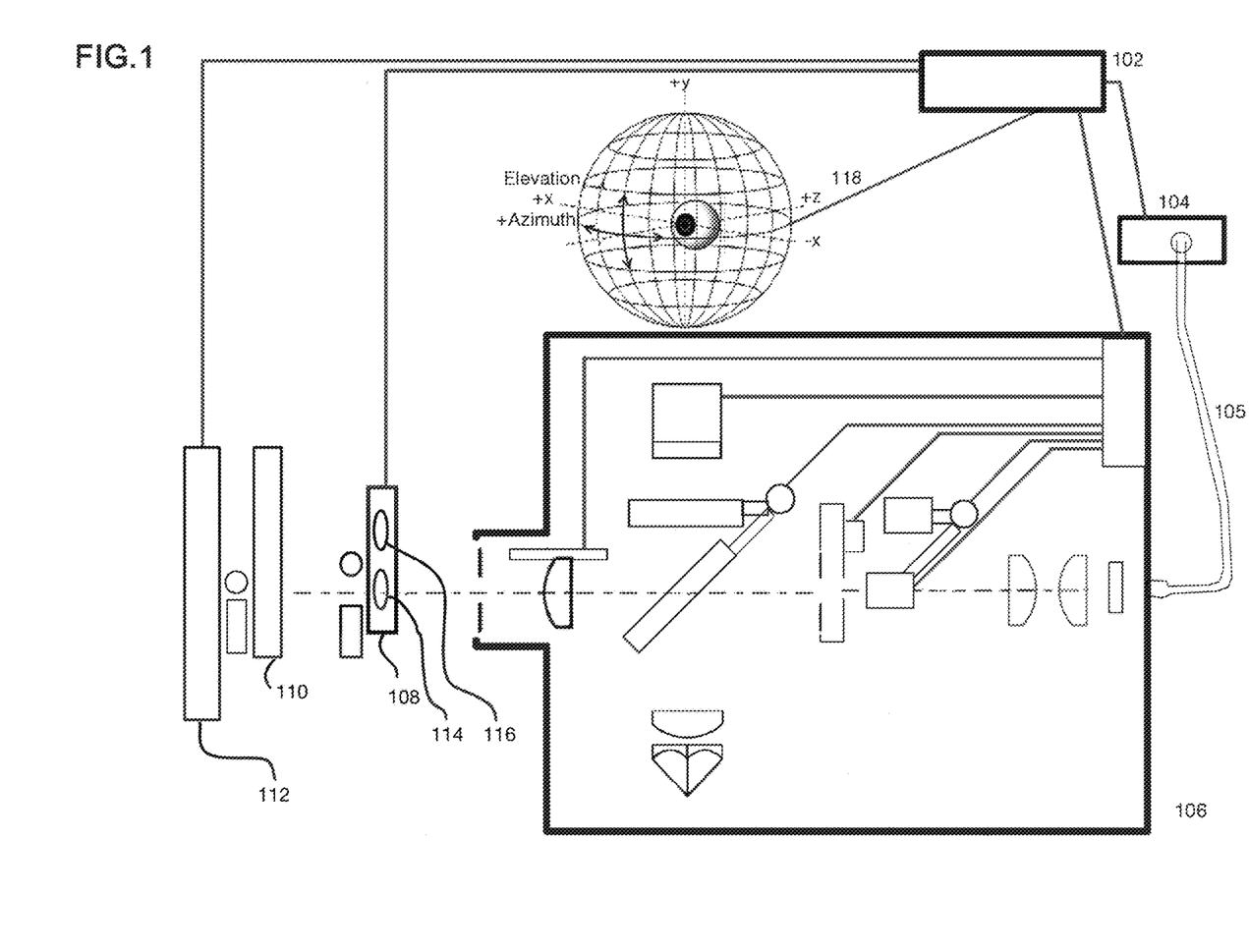
FIG. 1 is a block diagram of some elements of an apparatus for performing high precision measurements of absolute color and luminance on NEDs, according to some embodiments of the disclosed invention.

FIG. 1 is a block diagram of some elements of an apparatus 100 for performing high precision measurements of absolute color and luminance on NEDs, according to some embodiments of the disclosed invention. As shown, a compact telescope 106 is coupled to a spectroradiometer 104 (for example, CCD detector-based grating spectroradiometer) via a fiberoptic light guide bundle 105 to perform measurements of absolute color and luminance on a NED under test 108. In some embodiments, the compact telescope 106 includes an entrance pupil of about 5 mm in diameter. An image captured by the telescope 106 depicts the precise region of the NED under test 108 that is measured by the spectroradiometer 104. An image captured by the telescope 106 provides information on the uniformity of the luminance and uniformity of the color of the NED device under test. Further, an image captured by the telescope provides information on the resolution of the NED device under test.

When performing high absolute accuracy color and luminance measurements, it's generally desirable to look at a small section of the NED, perhaps a single character or symbol in the display, rather than viewing the entire display at once. Therefore, it is useful if the size of the telescope's field stop, and hence, the optics field-of-view, can easily be changed in order to vary the size of the region sampled from the device under test (DUT). A series of many different area defining measurement apertures can be manually or automatically inserted at the field stop of the telescope system to define FOV sizes of, for example, 5°, 2°, 1°, 0.5°, 0.33° and 0.1°. For example, a known aperture wheel or slide mechanism may be included in the focal plane and include a number of apertures of varying sizes, one of which is placed in the light path centered on an axis of the light path. A controller circuit and associated circuitry (e.g., I/O, memory and logic circuits) 102 positions or senses the position of the selected aperture at the selected measurement aperture field of view position. The disclosed invention allows the aperture mechanism to be mounted normal to the light path so that any adverse effects due to parts of an aperture being outside the focal plane are avoided.

The compact telescope 106 also includes an internal video camera view finder (206 in FIG. 2) with an image sensor plane (204 in FIG. 2) that captures the image of the DUT virtual scene which can be viewed and stored as part of the controller circuit 102. The captured image can also be analyzed for uniformity of the DUT virtual image scene as well as the resolution through a depth of contrast measurement or Fourier Transform computation, as part of controller circuit 102. The telescope also includes a graphics generator, as part of a controller circuit 102, to display test patterns and color fields on a display device.

An auto-collimation reference mirror 110, is large enough to cover the distance between the outer edges of the left 114 and right 116 eye pupils of the NED provides a planar mirrored reference surface (PMRS) to establish two parallel optical axes at the right 114 and left eye 116 positions of the NED so that any parallax deviation of the NED can be determined using the integral autocollimator configuration of the telescope 106.

A light source 112, for example, a light emitting diode (LED)-based tunable in color and luminance light 112 provides different light levels and different spectral power distributions through the use of multiple LEDs of different wavelengths with individual intensity control for each LED that are mixed in an optical integrating cavity, as known in the art. Consequently, the depth of contrast of the NED can be determined with these simulated real-world background brightness levels with different spectral power distributions to simulate the different ambient backgrounds available in the real world that could be visible through Augmented Reality NEDs.

In some embodiments, the telescope 106 has four built in modes of operation. The first mode allows the operator to align and establish an optical measurement reference axis. The second mode allows the operator to view and define the measurement area, the third mode captures an image of the defined measurement area and the complete field of view of the viewfinder digital camera, and the fourth mode acquires a spectroradiometric measurement. In some embodiments, a single command from the user through the circuit controller 102 initiates both image capture and spectroradiometric measurement modes in rapid succession.

In some embodiments, the controller circuit 102 positions each axis of a mechanical multi-axis (e.g., 6 axis) mounting platform 118 attached to the compact telescope 106. This allows for automatic placement of the compact telescope 106 in different locations relative to the NED under test 108 left eye position 114 or right eye position 116 and pointing direction so different areas of the virtual scene can be aligned with the measurement aperture. In some embodiments, the compact telescope 106 can be moved back and forward.

Figure 2:
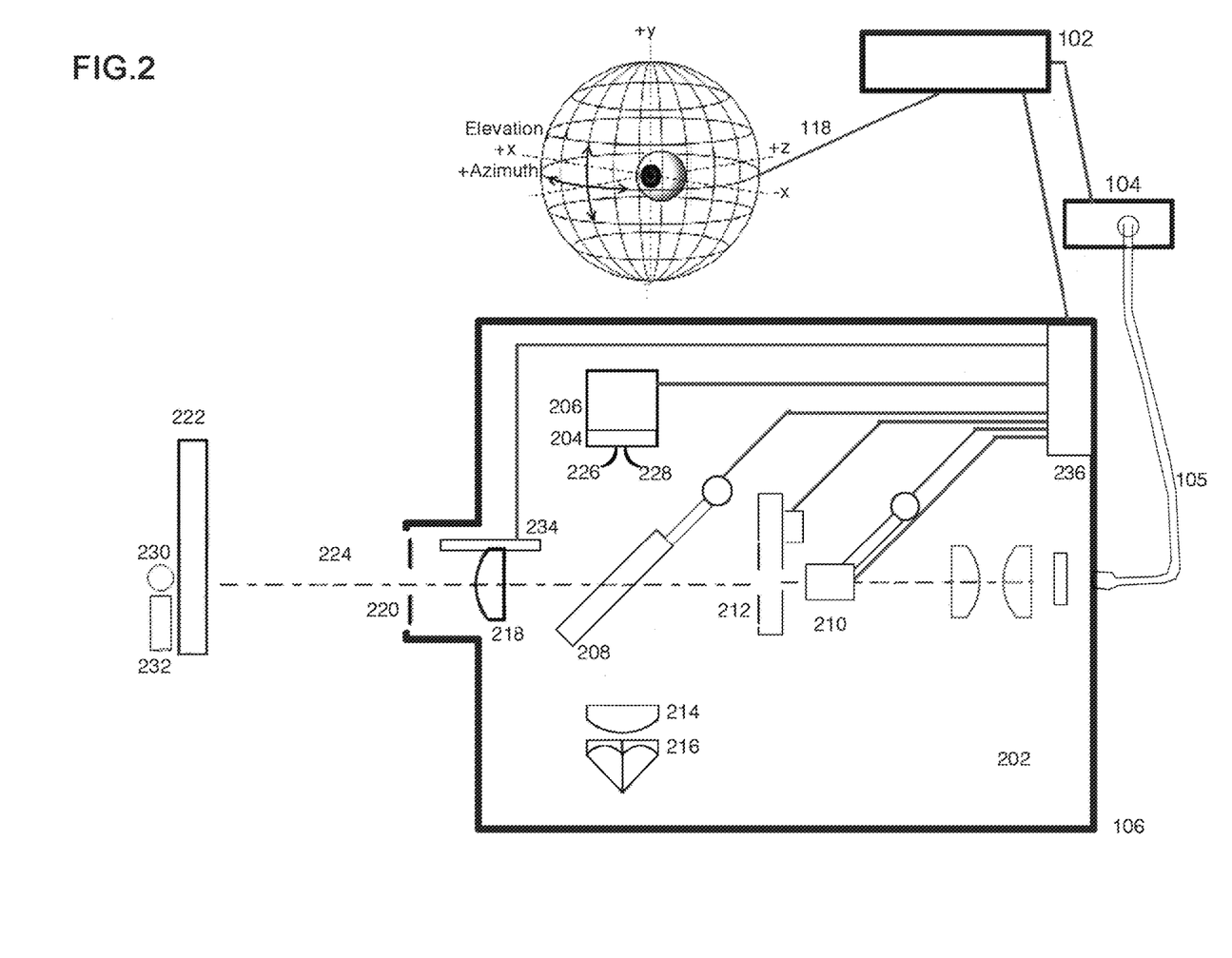
FIG. 2 is a block diagram of the optical layout of a measurement apparatus in an auto-collimation mode, according to some embodiments of the disclosed invention.

FIG. 2 is a block diagram of the optical layout of a compact telescope 106 for performing high precision alignment of the reflex optics 202 optical axis 224 in a viewing mode, according to some embodiments of the disclosed invention. In this example, the right part of the optical axis is blocked by the position of LED 210 projecting light out through the beamsplitter 208 and the objective lens 218 to serve as a reference for the alignment of the reflex optics 202 optical axis 224 and the surface normal of a Planar Mirror Reference Surface (PMRS) 222 to the surface normal reflectance of the physical display surface in VR NED measurement applications and also AR applications.

In some embodiments, when the apparatus is being used to perform high precision alignment, reflex optics 202 are employed in order establish parallel optical axis for the left and right of the NED that will be imaged by the telescope 106 that includes a sensor plane 204 at its view finder. To accomplish this, a thin beamsplitter 208 is inserted into the optical path of the telescope. This enables light from an LED lamp 210, which is also positioned behind a selectable measurement area defining, field-of-view (FOV) aperture 212, to project onto the NED and illuminate the precise area that is being viewed by the telescope on a display. This illumination, along with anything displayed on the NED, are then reimaged on to the telescope sensor plane 204. In some embodiments, the beamsplitter 208 is positioned at 45 degrees to the light path and optical axis 224.

In some embodiments, the beamsplitter 208 may include a transparent polymer films (in some embodiments, 3 to 5 microns thick) supported on a metal frame having one uncoated surface and one reflection coated surface, and aligned to provide light in a path normal to the focal of the sensor plane 204. This form of beamsplitter provides approximately 50% of the light in the path to the focal plane, which is adequate for the video viewfinder digital camera 206 image sensor plane 204 to provide an image of the DUT virtual scene to the controller circuit 102. The coated surface of the beamsplitter 208 may be facing the objective lens 218.

In some embodiments, the beamsplitter 208 may include a glass plate having one uncoated surface and one antireflection coated surface, and aligned to provide light in a path normal to the sensor plane 204. This form of beamsplitter provides approximately 4% of the light in the path to the focal plane, which is adequate for the video viewfinder digital camera 206 image sensor plane 204 to provide an image of the DUT. In this configuration of the reflex optics 202, the lamp 210 positioned behind the Field of View aperture 212 projects some percentage of light out through the beamsplitter 208, the objective lens 218 and the entrance pupil 220.

The remaining percentage of projected light from the lamp 210 reflects off the beamsplitter 208 down toward the collimating lens 214 and retroreflector prism 216. This light entering the retroreflector prism 216 passes back through the collimating lens 214 toward the beamsplitter 208. A portion of this light passes through the beamsplitter 208 and forms an image 226 of the projected FOV aperture 212 on the image sensor plane 204 of the viewfinder digital camera 206. This is the FOV reference image 226 of illuminated FOV aperture 212. In some embodiments, the compact telescope 106 can be moved back and forward on the optical axis 224 to measure any parallax on the DUT.

When the objective lens 218 is set to infinity focus relative to the FOV aperture 212 by setting the distance between the FOV aperture 212 at the focal point of the objective lens 218, the portion of light that passed through the beamsplitter 208 projecting out through the objective lens 218 and entrance pupil 220 to the PMRS 222 is collimated by adjusting the distance between the objective lens 218 and the FOV aperture 212. Motion mechanism 234 is able to position the objective lens 218 at different distances from the FOV aperture 212 from control circuit 236 in the compact telescope 106. Controller circuit 102 is also used as part of the positioning process of objective lens 218 relative to the position of the FOV aperture 212. The collimated light is reflected off of the PMRS 222. When the PMRS 222 surface normal is parallel to the optical axis 224 defined by the optical center of the objective lens 218 and the center of the FOV aperture 212, the reflected light passes back through the entrance pupil 220, objective lens 218, some portion reflects off of the beamsplitter 208 and when the distance of the objective lens 218 is at its focal distance from the FOV aperture 212, forms the most well defined image 228 of the FOV aperture 212 on the image sensor plane 204 of the viewfinder digital camera 206.

If the surface normal of the PMRS 222 is aligned to be parallel to the telescope optical axis 224, the image of the projected FOV aperture 226 will be directly superimposed on the image 228 of the FOV aperture 212. Any angular deviation of the surface normal from the optical axis will produce an image 228 of the FOV aperture 212 that is offset from the image position of the FOV Reference Image 226 and the pointing direction of the telescope optical axis 224 can be redirected to the precise alignment direction. The pointing direction may be redirected by manual setting of the elevation 230, azimuth 232 mirror angle adjusters and/or the controller circuit 102 positioning the optical axis 224 parallel to the PMRS 222 surface normal with the 6 mechanical axis mounting platform 118 attached to the compact telescope 106.

In some embodiments, the FOV measurement aperture 212 can be interchanged for different diameter or area measurement apertures either with a manual interchange or with motor 238, by control circuits 236 and 102, moving, for example, a wheel or slide mechanism that maintains the center location position on and along the optical axis 224 of each of the different diameter or area FOV measurement aperture 212.

Figure 3:
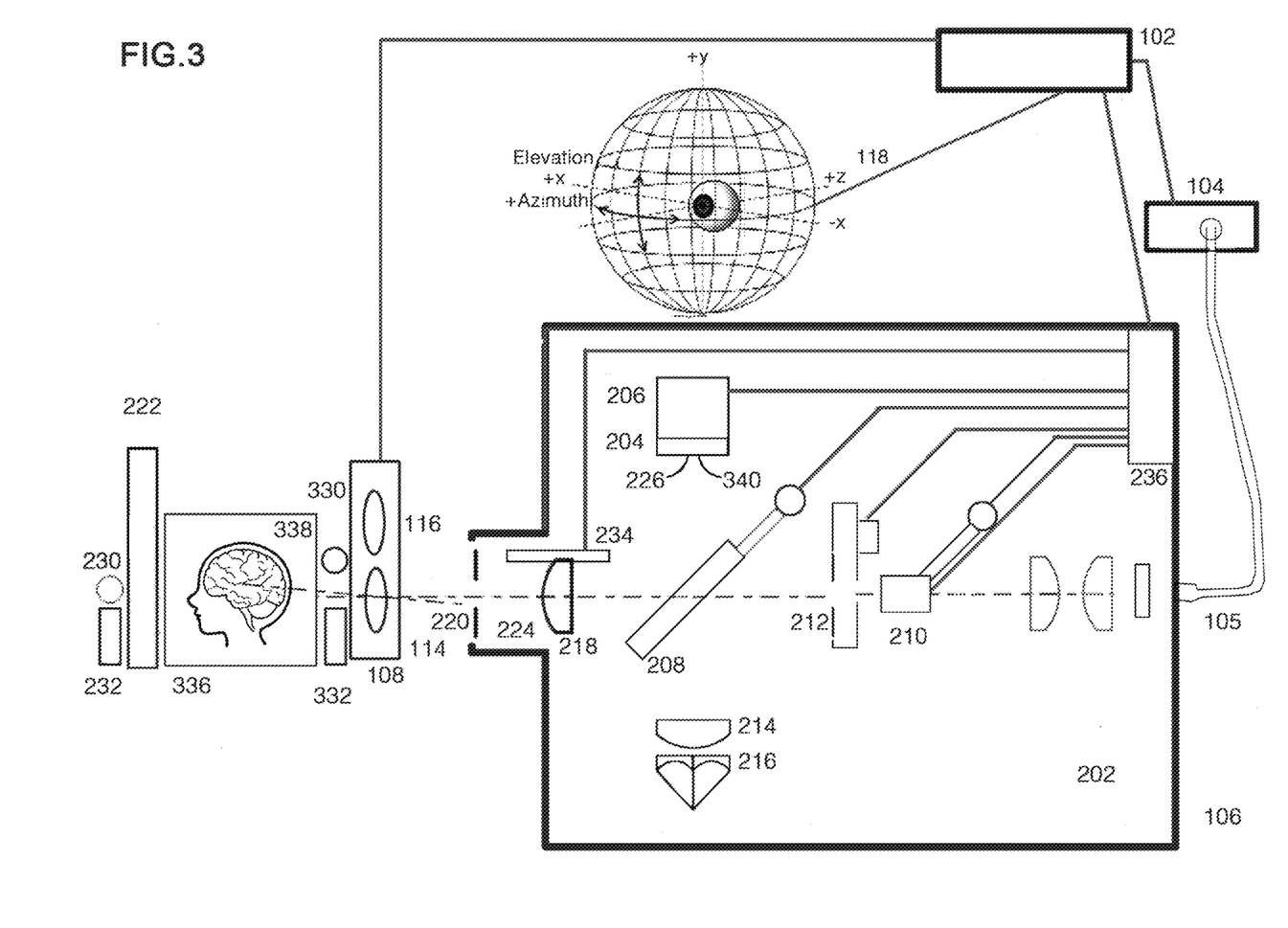
FIG. 3 is a block diagram of the optical layout of a measurement apparatus in a viewing and image capture mode, according to some embodiments of the disclosed invention.

FIG. 3 is a block diagram of the optical layout of a measurement apparatus in a viewing and image capture mode, according to some embodiments of the disclosed invention. When the disclosed invention is being used to view and define the measurement area, reflex optics 202 are employed in order to identify the exact portion of the NED virtual scene 336 that is to be imaged by the telescope objective lens 218, reflect off of the beamsplitter 208 and onto the image sensor plane 204 of viewfinder digital camera 206. The sensor plane is connected to a display monitor of the controller 102, which renders an image 340 of the NED virtual scene 336.

The precise location of the NED virtual scene 336 relative to the FOV measurement aperture 212 needs to be established to know where the measurement sample is relative to the details in the image 336. To accomplish this, light from an LED lamp 210, which is positioned behind a selectable field-of-view (FOV) aperture 212, projects light out toward the beamsplitter 208 along the optical axis 224. This light is reflected from the rear of the beamsplitter 208 through collimating lens 214 to a corner cube retroreflector (or prism) 216 in order to return light defining the image of the aperture 212 to the rear of the beamsplitter. At least, 45% of the light is transmitted toward the view finder 206 image sensor plane 204. The collimating lens 214 is positioned at the focal length distance from aperture 212. This collimates the light entering corner cube retroreflector 216 which retro-reflects light back through the collimating lens 214.

At least 45% percent of this retroreflected light passes through the beamsplitter 208 and forms an image 226 of the measurement FOV aperture 212 at the image sensor plane 204 of the viewfinder digital camera 206. Because the same beamsplitter directs both the light from the NED virtual scene 336 to form image 340 and light from the lamp 210 to form image of the aperture 212, the illuminated image 226 of the measurement aperture is superimposed on the image of the DUT virtual scene 340. The operator can know the precise location that the measurement aperture 212 will collect light from the NED virtual scene 336. Any errors in the angle of the beamsplitter 208 are self-compensating in that if the beamsplitter pivots or moves, the images of the DUT virtual scene 340 and aperture image 226 move together. When the image 340 of the DUT virtual scene 336 is evaluated by controller circuit 102 and control circuit 236, the position of the objective lens 218 may be adjusted using the motion mechanism 234 for focus adjustment 234 to verify that the image 340 of the DUT virtual scene is in sharp focus.

When working with AR systems, this functionality also facilitates measurement telescope optical axis 224 alignment to the optical axis 338 of the DUT, as well as the measurement of parallax, between the left 114 and right eye 116 sides of the NED DUT 108. Accordingly, a mirror 222(110) with elevation angle adjustment 230 and azimuth angle adjustment 232 which is large enough to cover both the left and right sides of the NED is placed where the virtual scene appears. Then the reflex optics 202 is used as an autocollimator, and the mirror angle is adjusted manually or automatically by adjusting the reflex optics 202 optical axis 224 through the controller circuit 102 with the multi-axis mechanical axis motion apparatus 118, until the beam is returned on itself. This means that the mirror 222(110) is perpendicular to the telescope optical axis 224 and provides a virtual object for the telescope (its own projected field stop) which appears to be at infinity (collimated) when the objective lens 218 is positioned with motion mechanism 234 at the objective lens 218 focal distance from the FOV aperture 212.

If the compact telescope 106 is moved manually or automatically from one eye position 114 of the NED 108 to the other eye position 116, in a plane perpendicular to the DUT optical axis 338, the autocollimator shows whether there has been any change in pointing angle by a shift of the position of image 226 of the FOV aperture 212 relative to the position of the image 340 of the NED virtual scene. Also, if the compact telescope 106 is moved a distance corresponding to the separation of the left and right eye displays in the NED, the measurement apparatus can determine the shift in pointing direction (or parallax) of any element that appears in the displays relative to the PMRS 222 surface normal.

In some embodiments with the opto-mechanical configuration shown in FIG. 3, the electrical power to the LED 210 can be switched off (with a switch) by circuit controller 102 connected to control circuit 236 or manually locally at the compact telescope 106 with the control circuit 236 to eliminate the image of the measurement aperture 226 from the image sensor plane 204 of the viewfinder digital camera 206, leaving the image of the DUT virtual scene 340. This image 340 of the virtual scene 336 formed on the image sensor 204 of the viewfinder 206 is captured by the controller circuit 102. In some embodiments, the controller circuit 102 generates test patterns for the DUT so that various image patterns can be analyze for the DUT performance characterization.

In some embodiments, the image sensor 206 includes a CMOS integrated circuit package with an array of 3008 rows and 4112 columns of individual light sensors. When the sensors are exposed to light they produce a charge that is proportional to the light level received. The viewfinder digital camera 206 and control circuit 102 collects the charge form each of the individual sensors and produce a tabular array of numerical data with each element of the detector sensor array corresponding to an individual numerical data value. The sub section of this tabular array of numerical values can be identified as the area of the virtual image scene also measured by the spectroradiometer after passing through the FOV measurement aperture 212. The measured spectroradiometer data over the visible spectral region is stored in control circuit 102 is analyzed by applying, for example, the ISO/CIE 11664-3:2012 Standard Colorimetric Observer weighting functions to the spectroradiometer data.

By applying the Standard Colorimetric Observer functions to the spectroradiometer measurement data the luminance and color within the area of FOV measurement aperture 212 can be determined and the color of the sub section of the image 340 of the DUT virtual scene 336 formed on the image sensor 204 of the viewfinder 206 defined by the image 226 of the FOV measurement aperture 212. The luminance and color in the sub area of the image sensor 204 defined by the image 226 is then correlated to the tabular numerical data corresponding to the average of all the individual light sensors in this sub area. The quotient between the numerical values outside the sub area and the average in the sub area is computed for each value in the tabular array. The tabular array of quotient values over the 3008 rows and 4112 columns of individual light sensor positions when multiplied by the luminance or color values creates a map of the uniformity of or color of the image 340.

In a similar way, the Modulation Contrast Function (MTF) of the DUT image scene 336 can be measured from the image 340. The circuit controller can display different scenes and test patterns on the DUT NED 108. A test pattern of vertical lines as the display scene 336 produces and image 340 as other display scenes and produces a tabular array of numerical data corresponding to the luminance over the entire image area of the image sensor 204. If an alternating pattern of vertical lines with one line active to 50% of maximum light output level and the next line set to 0 (zero) light output level vertical lines, and the light sensor columns are rotationally aligned to the image of the alternating vertical lines, the resulting numerical tabular values produced in the control circuit 102 is analyzed to determine the Ratio between the low luminance values for the 0 light level columns in the numerical tabular data array divided by the 50% maximum light output luminance values for the 50% light level columns in the numerical tabular data array. This ration is the depth of modulation contrast ratio of the DUT NED for that line pair frequency. A similar process can be repeated for 2 lines on, two lines off, three lines on, 3 lines on and so on to create a set of contrast values that when taken together characterize the MTF of the display producing a scene the depth of modulation contrast as a function of the line pair frequency. A similar process is repeated but with horizontal lines replacing the vertical lines.

Accordingly, display performance characteristics such as luminance and color uniformity and resolution can be determined over the complete field of view from the image 340 of the DUT virtual scene 336 captured by the Image sensor plane 204 of the video viewfinder digital camera 206. A full software suite of image analysis tools in controller circuit 102 is used to determine metrics such as color uniformity, luminance uniformity, image contrast, MTF and chromatic aberration. These quantities can then be correlated with the subsequent or previous spectroradiometric measurement defined by the area 226 of image sensor 204 pixels. Analysis of the spectroradiometer data yields luminance and color of the light from the NED contained within the telescope FOV.

Figure 4:
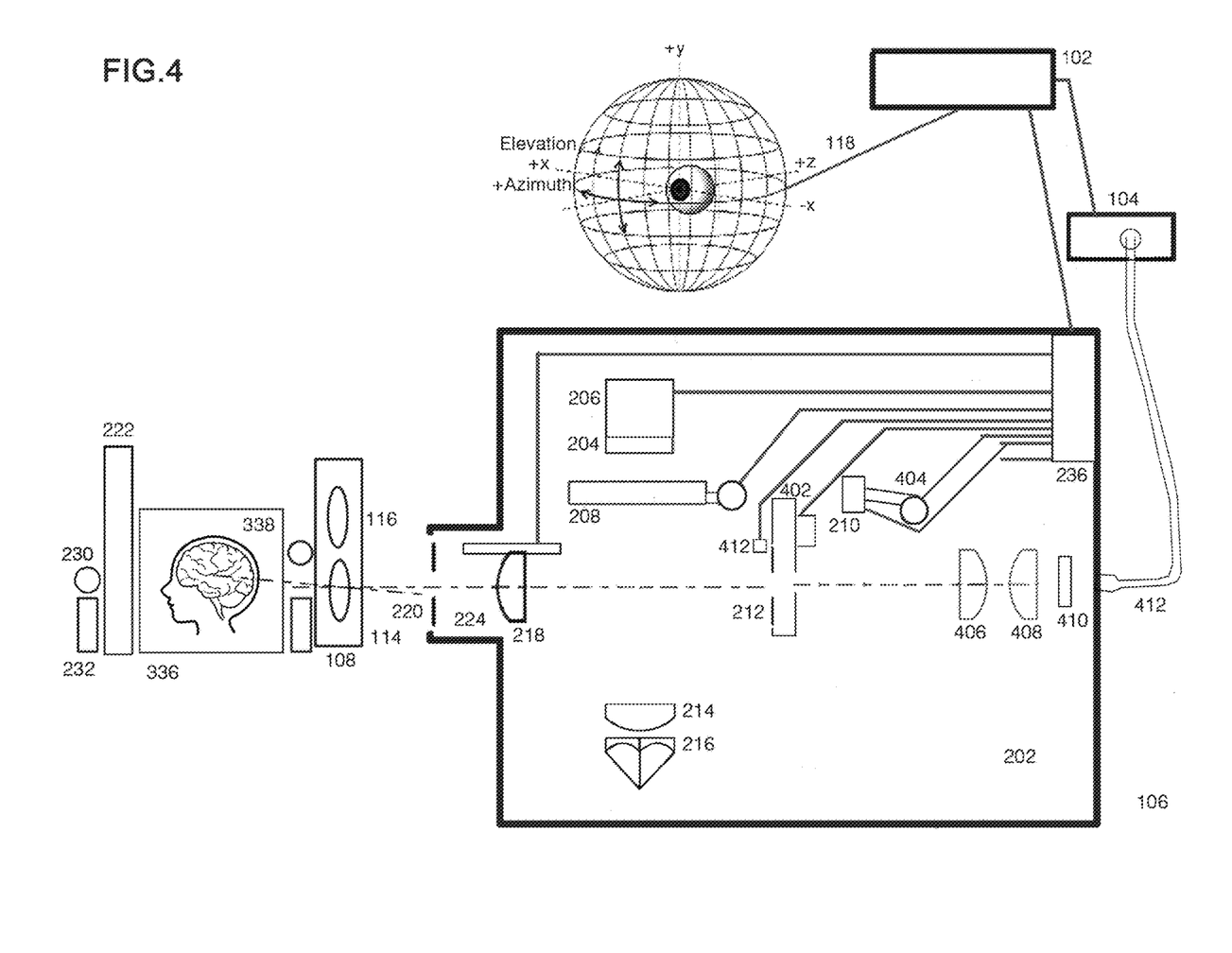
FIG. 4 is a block diagram of the optical layout of a measurement apparatus in a flicker measurement mode, according to some embodiments of the disclosed invention.

FIG. 4 is a block diagram of the optical layout of a measurement apparatus in a measurement mode, according to some embodiments of the disclosed invention. As depicted, the compact telescope 106 and the reflex optics 202 in FIG. 3 are modified by a first motor 402 moving beamsplitter 208 and by a second motor 404 moving LED 210 out of the optical path along the optical axis 224 using the control circuit 236 and the controller 102 so that none of the light passing through FOV aperture 212 is blocked from reaching lens 406 and lens 408. This leaves the entrance pupil 220, objective lens 218 and FOV measurement aperture 212 in the same position and orientation relative to the DUT virtual scene 336 completely unchanged.

As shown, light from the virtual image of the NED 336 enters an entrance pupil 220 from the left and is imaged by the objective lens 218 onto the FOV measurement aperture 212. A portion of NED virtual scene image light passes through the FOV measurement aperture 212 and collected by relay lens 406 and lens 408 into a spatial mixer 410. In some embodiments, the spatial mixer assures that illuminated subareas of the entrance pupil 220 which pass through the objective lens 218 and pass through the FOV measurement 212 aperture provide a uniform illumination of the spectroradiometer input 412 and hence a uniform measurement of radiance of the DUT virtual image 336, for any location of the illuminate sub area of the entrance pupil 220.

The output from the spatial mixer 410 enters the end of a fiber optic light guide 412, which transfers the light to the spectroradiometer 104.

The relay lenses 406 and 408 are of sufficient diameter to collect all light passing through any of the selectable FOV measurement field apertures 212 and deliver it to entry surface of the spatial mixer 410. An additional function of the relay lenses 406 and 408 is to image the entrance pupil aperture 220 into spatial mixer 410 that spatially decouples the individual fibers in the fiber optic light guide 412 from the entrance pupil 220. The spatial mixer 410 is useful especially when the entrance pupil 220 is not uniformly filled by the illumination in the design eye box of the NED DUT.

Figure 5:
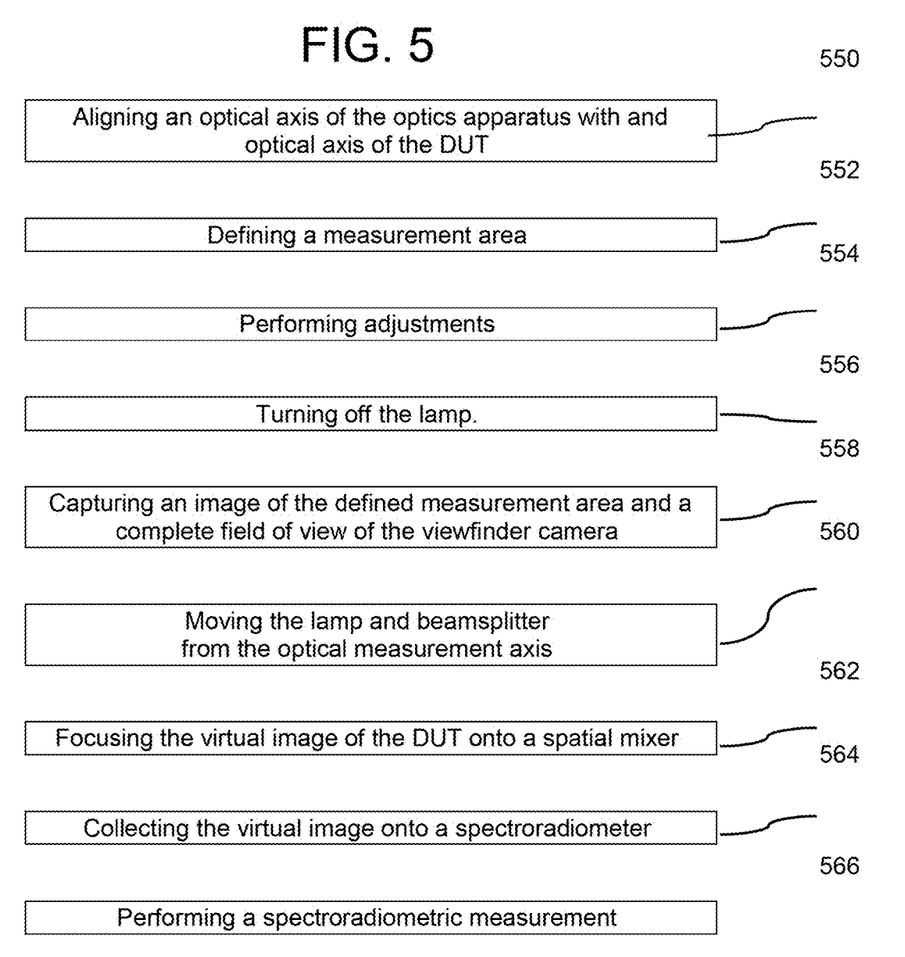
FIG. 5 is a process flow for performance characterization of multi configuration near eye displays, according to some embodiments of the disclosed invention.

FIG. 5 is a process flow for performance characterization of multi configuration near eye displays, according to some embodiments of the disclosed invention. In these embodiments, the invention determines the position of the virtual image of the field stop relative to the image of the object or virtual image being measured and then performs spectroradiometric measurement on the captured image of the defined measurement area. As shown in block 550, an optical axis of the optics apparatus is aligned with an optical axis of the DUT to establish an optical measurement axis. In some embodiments, this alignment process includes superimposing a first image of a field-of-view (FOV) aperture reflected from a beamsplitter that is collimated and reflected back onto the beamsplitter onto a second image of the FOV aperture, back illuminated by a lamp, projected onto the DUT and reflected back onto the same beamsplitter. A more detailed of the alignment process including the optical components is described above with respect to FIGS. 1 and 2. In some embodiments, a 7 mm diameter or smaller entrance pupil of the optics apparatus is positioned within the design eye box (qualified viewing space) of a near eye display device under test.

In block 552, a measurement area is defined on a virtual image of the DUT. This defined measurement area viewed in a view finder of for example, a viewfinder digital camera, needs to be the same as that to which the spectroradiometer is responding. In some embodiments, reflex optics are utilized to identify the exact portion of the NED virtual scene that is to be imaged.

In block 554, adjustments to the pointing direction are performed to move the captured image of the defined measurement area and the complete field of view of the view finder to establish alignment of the FOV measurement aperture to the image of the DUT virtual image and selection of the diameter of the FOV measurement aperture from the selection available, for example, by respective motors controlled by the controller circuit 102. Adjustments are made to the position of the objective lens relative to the FOV measurement aperture to obtain a sharp focus of the DUT virtual image. This adjustment establishes the alignment of the FOV measurement aperture to another area within the DUT scene field of view. Because the same beamsplitter directs both the light from the DUT virtual image to form the viewfinder image and light from the lamp to form image of the FOV aperture, the illuminated image of the FOV aperture is superimposed on the image of the DUT virtual image, if not, then some adjustment needs to be performed as explained above. Accordingly, the user/operator can know the precise location that the FOV measurement aperture will collect light from the NED virtual image and corresponds to a specific area of sensor elements in the viewfinder digital camera image sensor which are at known and stored locations on the image sensor.

In block 556, the lamp that is back illuminating the FOV measurement aperture is switched off allowing just the image of the DUT virtual image to be seen by the viewfinder digital camera image sensor. In block 558, an image of the defined measurement area and a complete field of view of the viewfinder digital camera is captured. In some embodiments, the captured image is stored in a memory of the controller circuit 102 for determination of depth of contrast and resolution and correlation to the spectroradiometric data.

In block 560, the (LED) lamp and the beamsplitter are the moved from the optical measurement axis, for example, by respective motors controlled by the controller circuit 102, so that none of the light passing through FOV aperture is blocked from reaching the spectroradiometers.

In block 562, the virtual image of the DUT is focused onto a spatial mixer so that illuminated subareas of the entrance pupil provide a uniform illumination of the spectroradiometer input. In block 564, the optical radiation from the spatial mixer is collected onto the spectroradiometers. In block 566, spectroradiometric measurements are performed on the captured image of the defined measurement area to characterize the performance of the DUT, as described above. The spectroradiometric measurements may then be correlated to the rest of the image sensor area of the DUT image captured and stored from the viewfinder digital camera by the controller circuit.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims and drawings.

The invention claimed is:

1. A method for performance characterization of mufti configuration near eye displays as a device under test (DUD by an optical apparatus, the optical apparatus including a viewfinder digital camera, the method comprising:
   aligning an optical axis of the optical apparatus with an optical axis of the DUT to establish an optical measurement axis, wherein the aligning comprises:
   forming a reference image of a field-of-view (FOV) measurement aperture illuminated by a lamp, wherein a first portion of a light illuminated by the lamp is reflected from a beamsplitter, collimated by a collimating lens and reflected back onto the beamsplitter, and a portion of the collimated light is captured as the reference image by the viewfinder digital camera,
   forming an actual image of the FOV measurement aperture by projecting a second portion of the light illuminated by the lamp from the beamsplitter onto the DUT and reflecting the second portion of the light by a mirror back onto said beamsplitter,
   projecting a third portion of the reflected second portion light onto the viewfinder digital camera by the beamsplitter, and
   capturing the third portion of the reflected second portion light by the viewfinder digital camera to form the actual image of the FOV measurement aperture,
   superimposing the reference image of the FOV measurement aperture and the actual image of the FOV measurement aperture to align the optical axis of the optical apparatus with the optical axis of the DUT to establish said optical measurement axis;
   defining a measurement area on a virtual image of the DUT;
   performing adjustments to transpose the captured image of the defined measurement area and a complete field of view of the view finder digital camera to establish alignment of the FOV measurement aperture to another area within the DUT scene field of view;
   turning off the lamp to allow only the virtual image of the DUT to be seen by the viewfinder digital camera;
   capturing an image of the defined measurement area and the complete field of view of the viewfinder digital camera, wherein the captured image of the defined measurement area and the captured image of the complete field of view of the viewfinder digital camera are both reflected from said beamsplitter;
   moving the lamp and the beamsplitter from the optical measurement axis so that none of the light passing through FOV measurement aperture is blocked from reaching a spectroradiometer;
   projecting the virtual image of the DUT onto the FOV measurement aperture;
   focusing an image of an entrance pupil of the optical apparatus onto a spatial mixer;
   collecting the virtual image from the spatial mixer onto a spectroradiometer; and
   performing spectroradiometric measurements on the captured image of the defined measurement area by the spectroradiometer.

2. The method of claim 1, further comprising storing the captured image of the defined measurement area.

3. The method of claim 1, further comprising correlating the spectroradiometric measurements to a corresponding measurement area on the captured DUT virtual image for luminance and color uniformity determination.

4. The method of claim 1, further comprising analyzing the captured image DUT virtual for uniformity and resolution of the DUT virtual image through a depth of contrast measurement or Fourier Transform computation.

5. The method of claim 1, further comprising spatially decoupling individual fibers in a fiber optic light guide from an entrance pupil of the apparatus to be directed to the spectroradiometers.

6. The method of claim 1, further comprising providing an objective lens to serve as a reference for the alignment of the optical axis of the optics apparatus with the optical axis of the DUT.

7. The method of claim 1, further positioning the objective lens at different distances from the FOV measurement aperture for focus adjustment.

8. The method of claim 1, wherein superimposing the first image of the FOV measurement aperture onto the second image of the FOV measurement aperture is performed by a Planar Mirror Reference Surface (PMRS).

9. The method of claim 1, further comprising spatially decoupling individual fibers in a fiber optic light guide from an entrance pupil of the optical apparatus to be directed to the spectroradiometers.

10. An apparatus for performance characterization of multi configuration near eye displays as a device under test (DUT) comprising:
 a mirror with elevation angle adjustment and azimuth angle adjustment positioned perpendicular an optical axis of the apparatus;
 an objective lens to capturing light from and projecting light to the DUT;
 a lamp for projecting light;
 a beamsplitter positioned between the objective lens and the lamp for reflecting light from the lamp;
 a collimating and reflective lens for collimating light reflected from the beamsplitter and reflecting it back towards an image sensor having a view finder to capture an virtual image of the DUT;
 a field-of-view (FOV) aperture to project light from the lamp onto the DUT through the objective lens, wherein the lamp illuminates a first image of the FOV aperture;
 a spectroradiometers for performing spectroradiometric measurements on a captured image of a defined measurement area to characterize the performance of the DUT; and
 a controller circuit for characterizing performance of the DUT based on the spectroradiometric measurements, wherein the first image of the FOV aperture that is reflected from the beamsplitter, collimated and reflected back onto the beamsplitter by the collimating and reflective lens is superimposed onto a second image of the FOV aperture projected onto the DUT and is reflected back onto said beamsplitter through the objective lens to align an optical axis of the optics apparatus with an optical axis of the DUT to establish an optical measurement axis.

11. The apparatus of claim 10, further comprising an optics apparatus with a 7 mm or smaller entrance pupil.

12. The apparatus of claim 10, further comprising a spatial mixer for spatially decoupling individual fibers in a fiber optic light guide from an entrance pupil of the apparatus to be directed to the spectroradiometers.

13. The apparatus of claim 12, further comprising a pair of relay lenses for imaging the entrance pupil aperture into the spatial mixer.

14. The apparatus of claim 10, wherein the controller circuit correlates the spectroradiometric measurements to a corresponding measurement area on the captured DUT virtual image for luminance and color uniformity determination.

15. The apparatus of claim 10, wherein the controller circuit analyzes the captured image DUT virtual for uniformity and resolution of the DUT virtual image through a depth of contrast measurement or Fourier Transform computation.

16. The apparatus of claim 10, further comprising one or more motors to move the lamp and the beamsplitter from the optical measurement axis.

17. The apparatus of claim 10, wherein the objective lens serves as a reference for the alignment of the optical axis of the optics apparatus with the optical axis of the DUT.

18. The apparatus of claim 17, further comprising a motion mechanism for positioning the objective lens at different distances from the FOV aperture.

19. The apparatus of claim 10, wherein the mirror is a Planar Mirror Reference Surface (PMRS) for superimposing an image of a projected FOV aperture on the image of the FOV aperture.

* * * * *

UNITED STATES PATENT AND TRADEMARK OFFICE
CERTIFICATE OF CORRECTION

PATENT NO. : 10,257,509 B2
APPLICATION NO. : 15/787631
DATED : April 9, 2019
INVENTOR(S) : Richard L. Austin et al.

It is certified that error appears in the above-identified patent and that said Letters Patent is hereby corrected as shown below:

In the Claims

Column 13, Line 56, Claim 1    delete "mufti" and insert -- multi --

Column 13, Line 57, Claim 1    delete "(DUD" and insert -- (DUT) --

Signed and Sealed this
Eighteenth Day of February, 2020

Andrei Iancu
*Director of the United States Patent and Trademark Office*